(12) United States Patent
Wang

(10) Patent No.: US 7,912,313 B2
(45) Date of Patent: *Mar. 22, 2011

(54) SHADING NOISE FILTER

(75) Inventor: Kuo-Jeng Wang, Kaohsiung (TW)

(73) Assignee: Transpacific Systems, LLC, Wilmington, DE (US)

( * ) Notice: Subject to any disclaimer, the term of this patent is extended or adjusted under 35 U.S.C. 154(b) by 1074 days.

This patent is subject to a terminal disclaimer.

(21) Appl. No.: 11/668,960

(22) Filed: Jan. 30, 2007

(65) Prior Publication Data

US 2007/0165963 A1     Jul. 19, 2007

Related U.S. Application Data

(63) Continuation of application No. 10/320,681, filed on Dec. 17, 2002, now Pat. No. 7,231,098.

(51) Int. Cl.
*G06K 9/40*     (2006.01)

(52) U.S. Cl. .................................. 382/274; 382/275

(58) Field of Classification Search ............. 382/274, 382/275
See application file for complete search history.

(56) References Cited

U.S. PATENT DOCUMENTS

| | | | | |
|---|---|---|---|---|
| 5,500,745 | A | * | 3/1996 | Iishiba et al. ............ 358/461 |
| 5,920,656 | A | | 7/1999 | Gahang |
| 6,486,980 | B1 | * | 11/2002 | Sawanobori ............ 358/487 |

* cited by examiner

*Primary Examiner* — Wesley Tucker
(74) *Attorney, Agent, or Firm* — Stolowitz Ford Cowger LLP

(57) ABSTRACT

A shading correction is employed for a scanner to correct shading distortion. However, an image corrected with the shading corrective curve has shading noise lines due to the effects of various factors in the producing process of the shading corrective curve. The characteristic of the shading noise is that the each value of any primary color channel, of each pixel in a line is higher or lower than of the adjacent two pixels in other lines, wherein a color channel is one of red, green, or blue channel Hence, the quality of the image is improved by removing the shading noise detected from the characteristic described above.

44 Claims, 5 Drawing Sheets

SHADING NOISE FILTER

CROSS REFERENCE TO RELATED APPLICATIONS

This application is a continuation application of U.S. application Ser. No. 10/320,681, filed Dec. 17, 2002 now U.S. Pat. No. 7,231,098. The entire disclosure of U.S. application Ser. No. 10/320,681 is considered as being part of the disclosure of the present application and is hereby incorporated by reference herein in its entirety.

BACKGROUND OF THE INVENTION

1. Field of the Invention

This invention relates to image editing, and more particularly to correcting shading noise.

2. Description of the Prior Art

In general, a scanning process of a scanner includes: moving a light source and a scanning module along a scanning direction by means of a stepper motor. Then, the light source illuminates the material of demand and is reflected into the scanning module. An: image is captured by a light sensor such as CCD (Charge-Coupled Device) and is then translated into digital data to be saved.

The digital data of the image is different from the captured data with the fight sensor, due to the light provided by the light source not being an ideal linear light. and the brightness varying along a direction of the arrangement of the light sensor. The brightness is approximately brighter in the center of the light than in the edge thereof, as shown in FIG. 1A. Therefore, the captured image is brighter in the center of the image than in the edge thereof due to a disproportionate brightness of the light source. In general, the brightness distribution of the light is pre-scanned and the captured data is efficiently corrected through use of the pre-scanned data, as shown in FIG. 1A.

Furthermore, a light sensor is a plurality of CCDs arranged in a line and the data detected by different CCDs is different due to each CCD having a different light sensitivity. Moreover, external factors may vary with time, for example: the variant of light resulting from a power supply varying with time, the variant in the light sensitivity of the CCD with time, etc. These factors are generally called "shading distortion". Therefore, the data of the image is corrected for the elimination of the disproportionate distribution of the light, but the corrected data still has a problem of being uneven, resulting from the shading noise, as shown in FIG. 1B.

The corrective method of the shading distortion is that the scanner pre-scans a reference white (a white corrective board) or a reference black (covering with the light sensor before capturing image). The data of the reference white or the reference black is the shading distortion corrective curve. Hence, a captured image can be corrected with the corrective curve to obtain a more corrective image data.

Nevertheless, the shading distortion corrective curve has local maximums or local minimums resulting from the noise of the electrical devices, bad CCDs, or inexact deductive methods. The local maximums or minimums resulting from random noise do not appear every time. The inexact deductive method causes the data to be improperly corrected. These results are generally called "shading noise". If the image data is corrected by a corrective curve that comprises shading noise, the resultant corrected image has some shading noise lines. The shading noise lines in the corrected image are caused by the shading corrective curve. While the shading corrective curve may be one dimensional, the shading noise that appears in the resultant corrected image appears as lines in a two-dimensional image in positions correlating to the shading distortions in the corrective curve.

Hence, the shading corrective curve in the conventional arts can correct the problem of shading distortion, but they easily generate problems with shading noise and reduce the quality of the image.

SUMMARY OF THE INVENTION

The conventional arts mentioned above can correct the shading distortion, but generates the problem of the shading noise. In accordance with the present invention, image editing may be used for correcting the shading noise to efficiently improve the problem of the shading noise resulting from the correction of the shading distortion.

It is another object of this invention to employ image editing to correct the shading noise for increasing the image quality.

In accordance with the above-mentioned objects, the present invention provides image editing for correcting the shading noise. In the present invention, it detects the shading noise by means of characteristics of the shading noise, and eliminates the shading noise for an increased image quality.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1A:
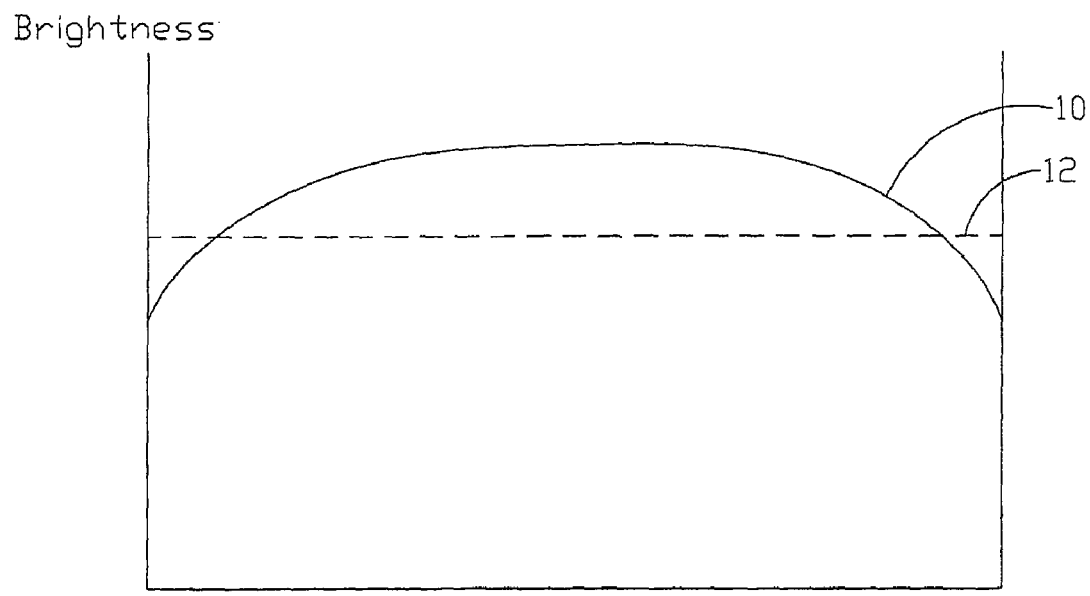
FIG. 1A is a diagram of the disproportionate brightness in a general scanner.
Figure 1B:
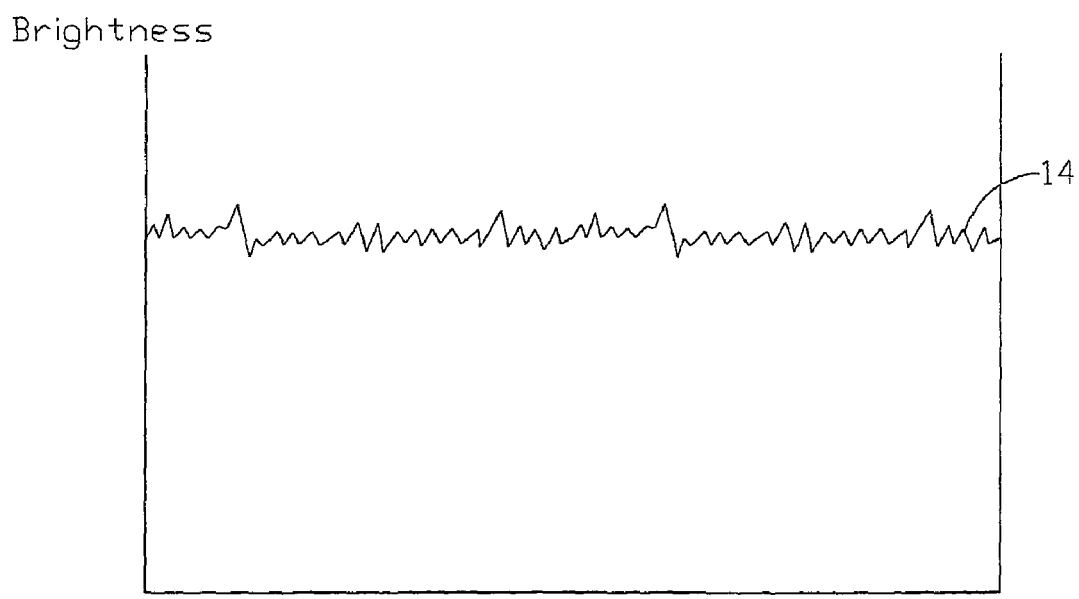
FIG. 1B is a diagram of an image with uneven brightness result from shading noises.
Figure 2:
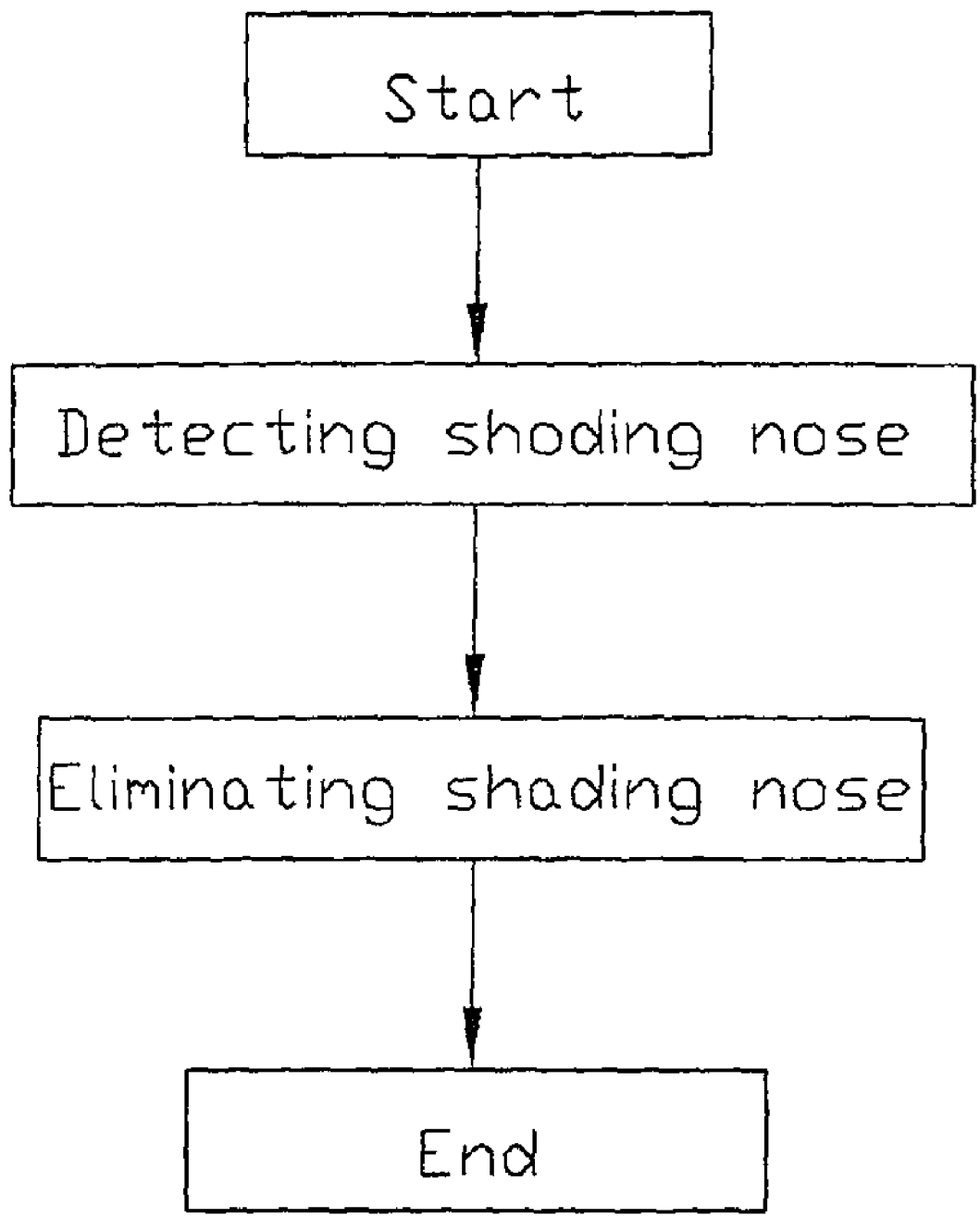
FIG. 2 is a flow chart of eliminating shading noises.

The process of obtaining the shading distortion corrective curve includes measurement with three primary colors RGB (red, green, and blue), respectively. Therefore, the characteristic of the shading noise is a line of one pixel width with one certain primary color in an image. The primary values in the pixels of the lines are lower or higher, than one preselected percentage of pixels (such as one certain percent, for example) of the color values of the primary color, within the two adjacent pixels in the adjacent lines. Therefore, the shading noise of an image can be detected and eliminated by means of the characteristic of the shading noise. The steps of eliminating shading noise are: start, detecting shading noise, eliminating shading noise, and end, as shown in FIG. 2. The characteristic is that one certain color value of the primary color of the pixels with shading noise is higher or lower than the color value of the same primary color of two adjacent pixels. Hence, the detecting function is:

$$X(i) > \mathrm{Max}[X(i-1), X(i+1)] \text{ or}$$

$$X(i) < \mathrm{Min}[X(i-1), X(i+1)]$$

wherein X(n) is the n$^{th}$ color value of one certain primary color.

Eq.(1) can be rewritten $$[X(i-1)-X(i)][X(i)-X(i+1)]<0 \quad (2)$$

If the i$^{th}$ pixel of the corrective curve has a shading noise in one certain primary color, the inage of two-dimension M×N corrected wrrith the corrective line. has a shading noise line ((ij), j=1 to N). Therefore, Eq. (2) in one-dimension can be rewritten to translate into Eq. (3) in two-dimension:

$$[X(i-1,J)-X(i,j)][X(i+1,j)]<0 \quad (3)$$

wherein x(ij) is a color value of one certain primary color and i is one certain value among 1 to M ,j=1 to N.

If the Eq. (3) is true dunig j=1 to N, the line of (i,j) j=1 to N) is a shading shading noise line. The primary color values with shading noise of the i$^{th}$ line ansforms into the average of two adjacent same primary color values in adjacent lines for correcting the shading noise.

$$Xn(i,j)=[X(i-1,j)+X(i+1,j)]/2 \quad (4)$$

wherein the Xn(i,j) is a new connected color value of (i,j) and j is 1 to N.

If the Eq. (3) is not true during j=1 to N, the line of (i,j: j=1 to N) is not a shading noise line and the color value in the lie is not corrected.

$$Xn(i,j)=X(i,j) \quad (5)$$

wherein j is 1 to N.

Figure 3:
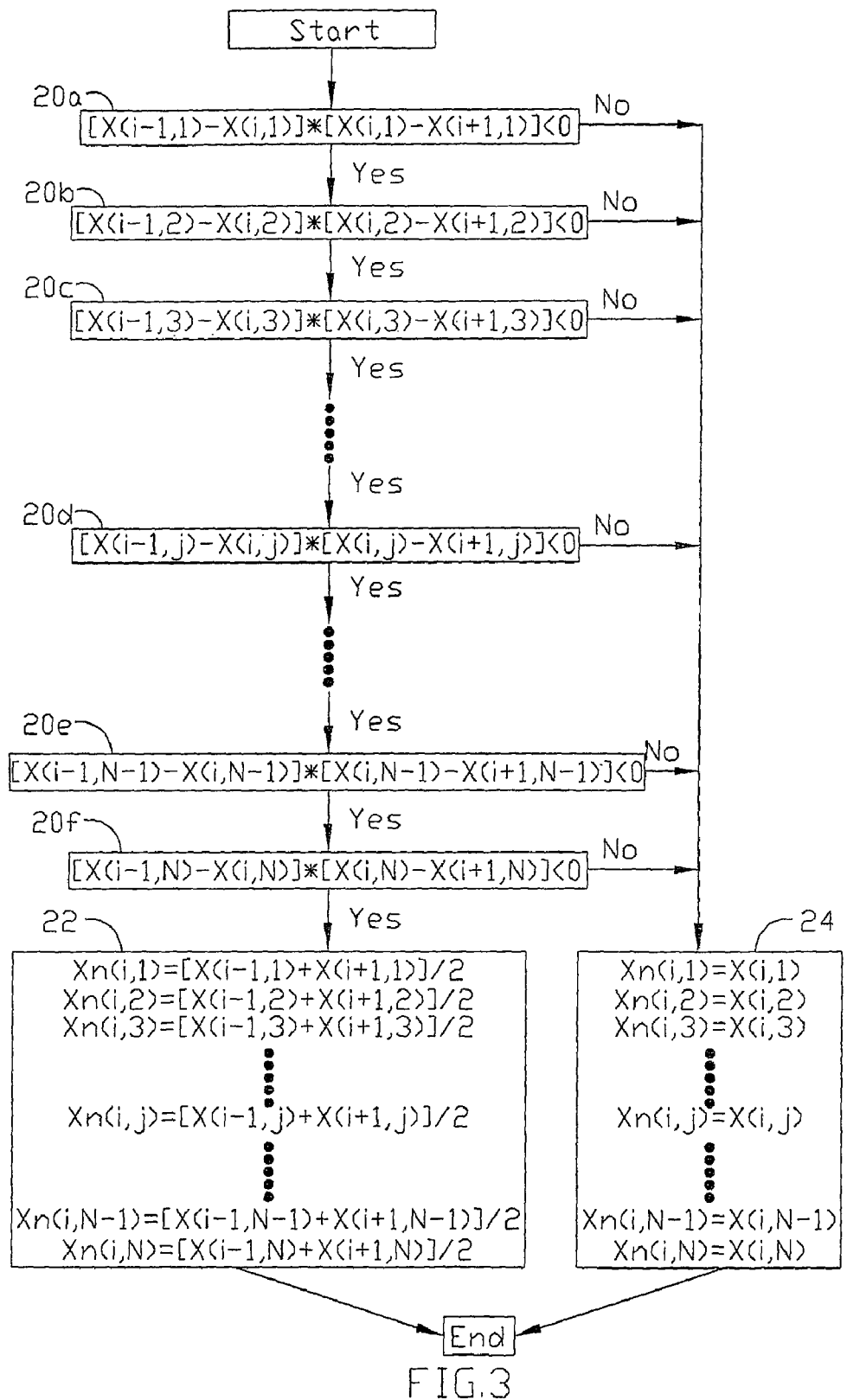
FIG. 3 is a flow chart of mathematical calculation of a shading noise function.

Referring to FIG. 3, a flow chart of mathematical calculation of a shading noise function is illustrated. Wherein, the block 20a to 20f is the detecting step; the block 22 is the correcting step; and the block 24 is the not correcting step.

Figure 4A:
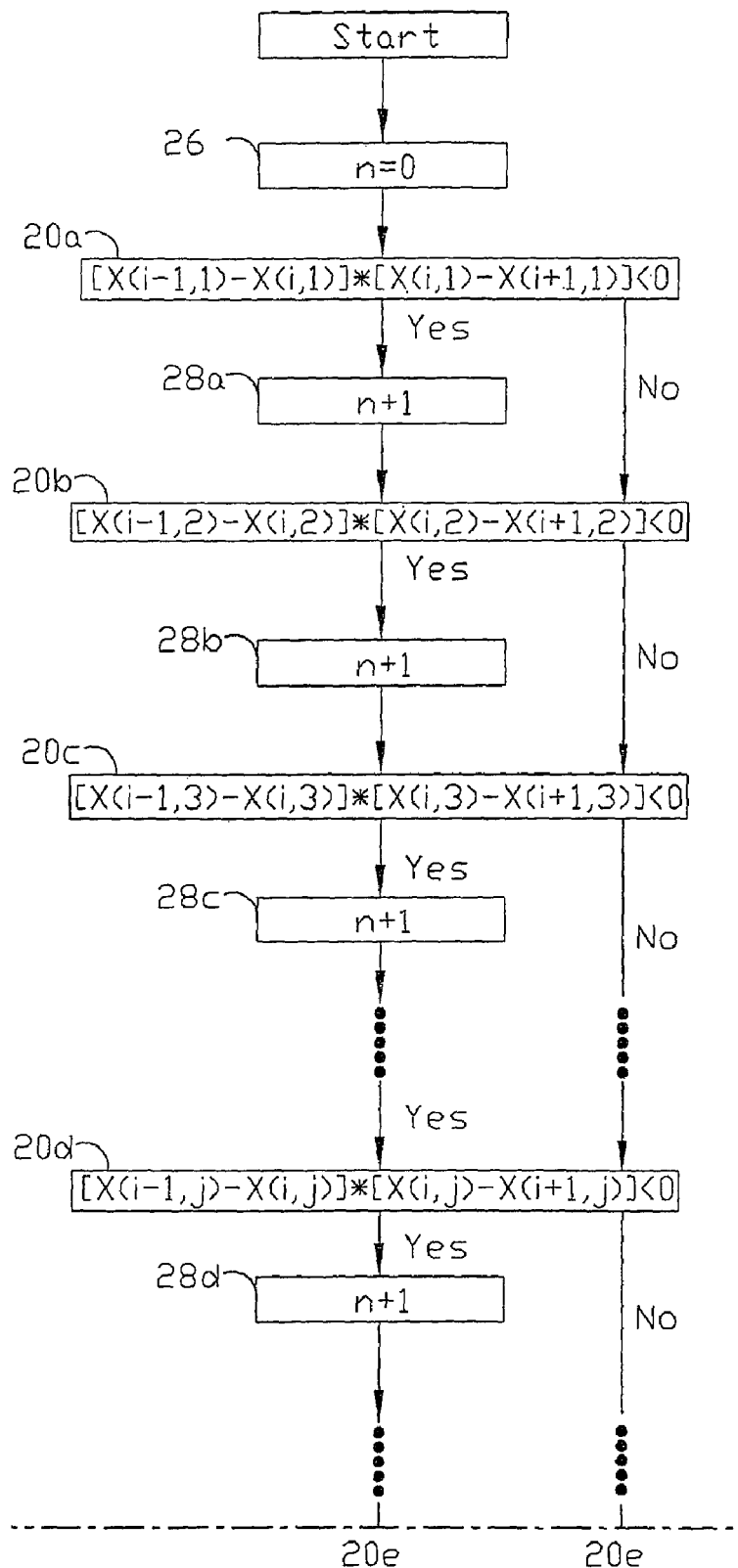
FIG. 4A to FIG. 4B is a flow chart of mathematical calculation of a shading noise function.
Figure 4B:
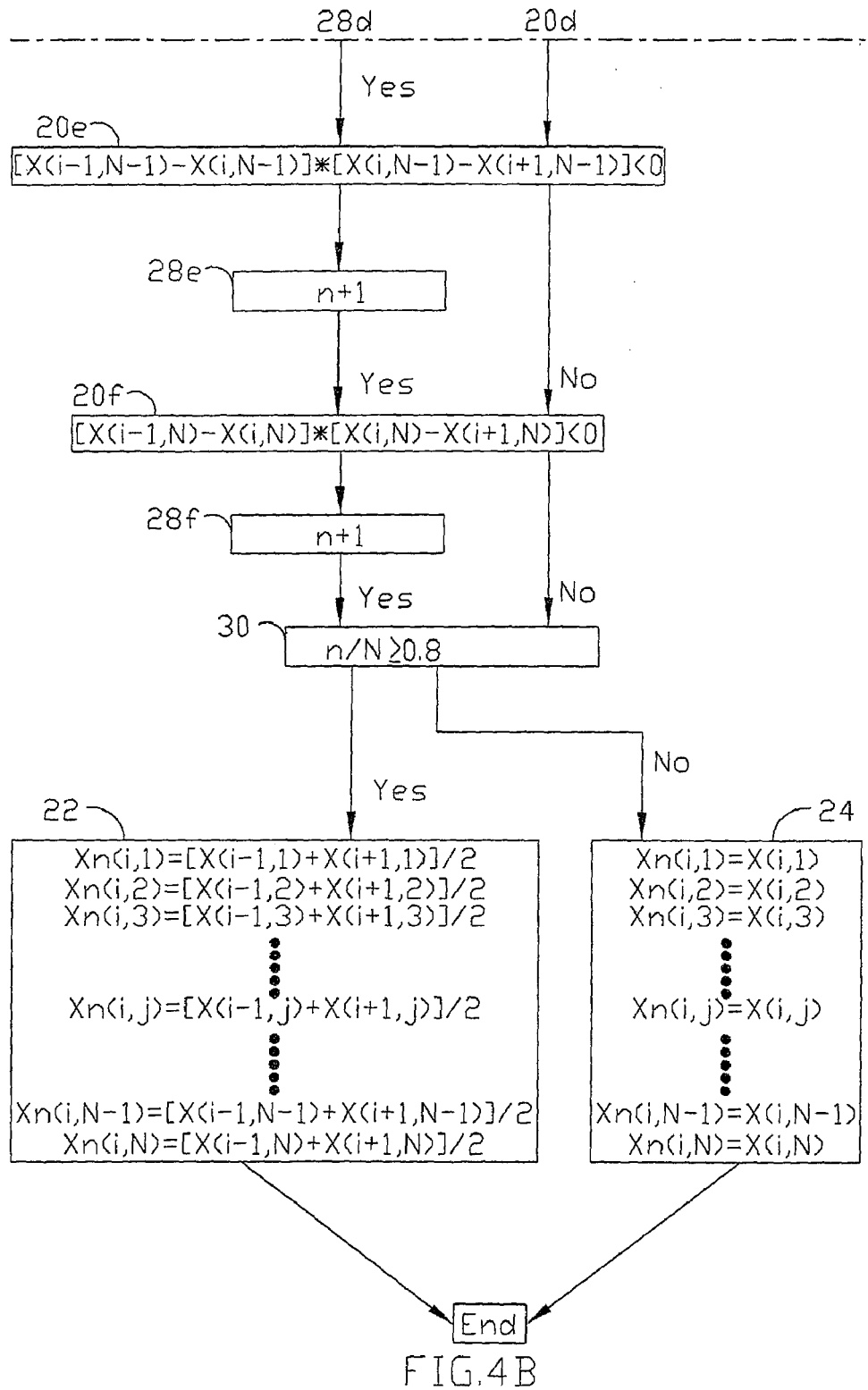

Regarding an image where the color or brightness greatly varies, the variant of the color or brightness may be larger than the variant of the shading noise. Therefore, Eq. (3) may be not true during j=1 to N. Accordingly, if more than one certain percent (e.g. 80%) thereof during j=1 to N is true, the color value may be corrected with Eq. (4). The value of the one certain percent can be determined according to different conditions. Referring to FIG. 4A and FIG. 4B, compared with FIG. 3B, the block 26, block 28a-28f, and block 30 are added. The block 26 includes setting a counter to 0; the block 28a-28f includes adding 1 to the counter; and the block 30 includes detecting a ratio of the counter value and N. If the ratio of the counter value and N is bigger than a predetermined ratio then the block 22 is performed; if not, then the block 24 is performed.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method, comprising:
   detecting shading noise in a given line of an image based at least in part on at least a portion of a first line adjacent said given line and at least a portion of a second line adjacent the given line: and
   generating a multiplication by multiplying a first difference taken between a pixel of said given line and at least one pixel on said first adjacent line and a second difference taken between the pixel of said given line and at least one pixel on said second adjacent line;
   wherein said detecting occurs responsive to a resulting sign of a product of the multiplication.

2. The method according to claim 1, further comprising:
   eliminating said shading noise from said given line responsive to the multiplication; and
   detecting shading noise by a characteristic of said shading noise.

3. The method according to claim 2, wherein said characteristic comprises a color value of a pixel in the given line being higher than that of the at least one pixel in said first adjacent line and the at least one pixel in said second adjacent line.

4. The method according to claim 2, wherein said characteristic comprises a color value of a pixel in the given line being higher than that of two adjacent pixels in said first and second adjacent lines for at least a preselected percentage of pixels.

5. The method according to claim 2, wherein said characteristic comprises a color value of a pixel in the given line being lower than that of two adjacent pixels in said first and second adjacent lines.

6. The method according to claim 2, wherein said characteristic comprises a color value of a pixel in the given line being lower than that of two adjacent pixels in said first and second adjacent lines for at least a preselected percentage of pixels.

7. The method according to claim 1, wherein the given line has shading noise if a detecting result of said detecting function is true for at least a preselected percentage of pixels.

8. The method according to claim 7, wherein said preselected percentage comprises 80 percent.

9. The method according to claim 3, wherein said color value is red, green, or blue.

10. The method according to claim 4, wherein said color value is red, green, or blue.

11. The method according to claim 2, wherein said generating the multiplication includes multiplying the first difference taken between a color value of the pixel on said given line and a color value of the at least one pixel on said first adjacent line and the second difference taken between the color value on the pixel of said given line and a color value of the at least one pixel on said second adjacent line.

12. The method according to claim 11, wherein said color value of said pixel on said given line is not corrected responsive to said detecting shading noise.

13. A method, comprising:
   detecting a shading noise in an image by multiplying a first difference by a second difference; and
   eliminating said shading noise from said given line in said image;
   wherein the first difference is taken between a color value of a first pixel adjacent to a given pixel on a given line and a color value of the given pixel on the given line;
   wherein the second difference is taken between a color value of a second pixel adjacent to the given pixel on said given line and said color value of said given pixel on said given line; and
   wherein said detecting the shading noise is responsive to a resulting sign of a product of said multiplying.

14. The method according to claim 13, further comprising determining shading noise in a line of said image responsive to detecting the shading noise in at least a preselected percentage of pixels.

15. The method according to claim 14, wherein said preselected percentage of pixels comprises 80 percent.

16. The method according to claim 13,
wherein eliminating said shading noise includes applying a new color value to said given pixel; and
wherein said new color value comprises an average of said color value of said first pixel and said color value of said second pixel.

17. The method according to claim 13, further comprising not correcting any color value of any pixel responsive to said detecting the shading noise.

18. An apparatus, comprising:
means for detecting shading noise in a given line of an image based at least in part on a multiplication of a first difference by a second difference; and
means for eliminating said shading noise from said given line in said image;
wherein the first difference is taken between a color value of a first pixel adjacent to a given pixel on a given line and a color value of the given pixel on the given line;
wherein the second difference is taken between a color value of a second pixel adjacent to the given pixel on said given line and said color value of said given pixel on said given line; and
wherein said detecting the shading noise is responsive to a resulting sign of a product of said multiplying.

19. The apparatus of claim 18, wherein said means for detecting shading noise comprises means for detecting shading noise by a characteristic of said shading noise.

20. The apparatus of claim 19, wherein said characteristic comprises said color value of said given pixel in said given line being higher than the color value of said first pixel or the color value of said second pixel.

21. The apparatus of claim 19, wherein said characteristic comprises said color value of said given pixel on said given line being higher than that of two adjacent pixels in first and second adjacent lines for at least a preselected percentage of pixels.

22. The apparatus of claim 19, wherein said characteristic comprises said color value of said given pixel on said given line being lower than that of two adjacent pixels in first and second adjacent lines.

23. The apparatus of claim 19, further comprising means for determining shading noise in a line of said image responsive to means for detecting the shading noise in at least a preselected percentage of pixels.

24. The apparatus of claim 23, wherein said preselected percentage of pixels comprises 80 percent.

25. The apparatus of claim 19,
further comprising means for eliminating shading noise by applying a new color value to said given pixel; and
wherein said new color value comprises an average of said color value of said first pixel and said color value of said second pixel.

26. An apparatus, comprising:
a scanner configured to:
detect a shading noise in an image by multiplying a first difference by a second difference; and
eliminate said shading noise from said given line in said image;
wherein the first difference is taken between a color value of a first pixel adjacent to a given pixel on a given line and a color value of the given pixel on the given line;
wherein the second difference is taken between a color value of a second pixel adjacent to the given pixel on said given line and said color value of said given pixel on said given line; and
wherein said detecting the shading noise is responsive to a resulting sign of a product of said multiplying.

27. The apparatus of claim 26, wherein said scanner is further configured to determine shading noise in a line of said image responsive to detecting the shading noise in said image.

28. The apparatus of claim 27, wherein said preselected percentage of pixels comprises 80 percent.

29. The apparatus of claim 26,
wherein said scanner is further configured to eliminate said shading noise by applying a new color value to said given pixel; and
wherein said new color value comprises an average of said color value of said first pixel and said color value of said second pixel.

30. An article of manufacture comprising a computer readable storage medium having stored thereon instructions that configure a processing device to:
generate a multiplication by multiplying a first difference taken between a pixel on a given line in an image and at least one pixel on a first adjacent line and a second difference taken between the pixel on said given line and at least one pixel on a second adjacent line; and
detect shading noise in said given line on said image based at least on a resulting sign of a product of the multiplication.

31. The article of claim 30, wherein the processing device is further configured to detect said detecting said shading noise by detecting shading noise by a characteristic of said shading noise.

32. The article of claim 31, wherein said characteristic comprises said color value of said pixel on the given line being higher than that of the at least one pixel on said first adjacent line or the at least one pixel on said second adjacent line.

33. The article of claim 31, wherein said characteristic comprises said color value of said pixel on the given line being higher than that of the at least one pixel on said first adjacent line or the at least one pixel on said second adjacent line for at least a preselected percentage of pixels.

34. The article of claim 31, wherein said characteristic comprises said color value of said pixel in the given line being lower than that of the at least one pixel of said first adjacent line or the at least one pixel of said second adjacent line.

35. The article of claim 31, wherein said characteristic comprises said color value of said pixel on the given line being lower than that of the at least one pixel on said first adjacent line or the at least one pixel on said second adjacent line for at least a preselected percentage of pixels.

36. The article of claim 31, wherein the processing device is further configured to detect shading noise responsive to detecting said shading noise for at least a preselected percentage of pixels.

37. The article of claim 36, wherein said preselected percentage comprises 80 percent.

38. The article of claim 31,
wherein the processing device is further configured to detect shading noise responsive to detecting said shading noises by multiplying said first difference with said second difference; and
wherein the first difference is between a color value of said pixel on said given line and a color value of said at least one pixel on said first adjacent; and
wherein the second difference is between a color value of said pixel on said given line and a color value of said at least one pixel on said second adjacent line.

39. The article of claim 38, wherein the processing device is further configured to eliminate said shading noise by applying a new color value to said given pixel that comprises an average of said color value of said at least one pixel on said first adjacent line and said color value of said at least one pixel on said second adjacent line.

40. An article of manufacture comprising a computer readable storage medium having stored thereon instructions that configure a processing device to:
- generate a multiplication by multiplying a first difference taken between a pixel of a given line in an image and at least one pixel on a first adjacent line and a second difference taken between the pixel of said given line and at least one pixel on a second adjacent line; and
- detect shading noise in said image based at least in part on a sign of a product of the multiplication.

41. The article of claim 40, wherein the processing device is further configured to detect the shading noise in a line in said image responsive to detecting the shading noise in at least a preselected percentage of pixels.

42. The article of claim 41, wherein the preselected percentage of pixels comprises 80 percent.

43. The article of claim 40,
- wherein eliminating said shading noise includes applying a new color value to said given pixel; and
- wherein said new color value comprises an average of said color value of said first pixel and said color value of said second pixel.

44. The article of claim 40, wherein the processing device is further configure to not correct any color value of any pixel responsive to said detecting the shading noise.

* * * * *

UNITED STATES PATENT AND TRADEMARK OFFICE
CERTIFICATE OF CORRECTION

| | | |
|---|---|---|
| PATENT NO. | : 7,912,313 B2 | Page 1 of 1 |
| APPLICATION NO. | : 11/668960 | |
| DATED | : March 22, 2011 | |
| INVENTOR(S) | : Wang | |

It is certified that error appears in the above-identified patent and that said Letters Patent is hereby corrected as shown below:

Title page, item (57), under "Abstract", in Column 2, Line 9, delete "channel" and insert -- channel. --.

Column 6, line 26, in Claim 31, delete "said detecting said" and insert -- said --.

Column 6, line 57, in Claim 38, delete "noises" and insert -- noise --.

Signed and Sealed this
Second Day of August, 2011

David J. Kappos
*Director of the United States Patent and Trademark Office*